Oct. 16, 1951    C. R. HANNA ET AL    2,571,869
SPEED CONTROL SYSTEM
Filed Sept. 7, 1944    3 Sheets—Sheet 1
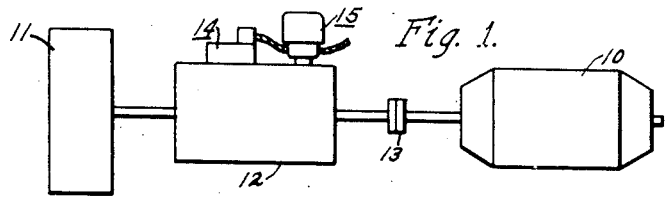
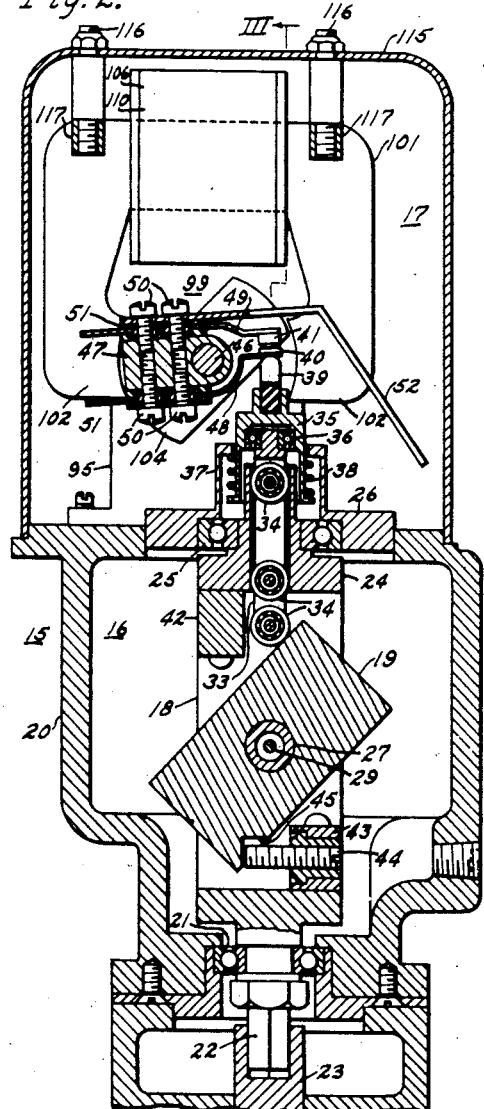
WITNESSES:
Leon M. Garman
F. P. Lyle
INVENTORS
Clinton R. Hanna and
Stanley J. Mikina.
BY O. B. Buchanan
ATTORNEY Oct. 16, 1951   C. R. HANNA ET AL   2,571,869
SPEED CONTROL SYSTEM
Filed Sept. 7, 1944   3 Sheets-Sheet 2

WITNESSES:
Leon M. Garman
F. P. Lyle

INVENTORS
Clinton R. Hanna and
Stanley J. Mikina.
BY C. B. Buchanan
ATTORNEY

Oct. 16, 1951　　　C. R. HANNA ET AL　　　2,571,869
SPEED CONTROL SYSTEM

Filed Sept. 7, 1944　　　　　　　　　　　3 Sheets-Sheet 3

Fig. 6.

WITNESSES:
Leo M. Garman
F. P. Lyle

INVENTORS
Clinton R. Hanna and
Stanley J. Mikina.
BY O. D. Buchanan
ATTORNEY

Patented Oct. 16, 1951

2,571,869

UNITED STATES PATENT OFFICE 2,571,869

SPEED CONTROL SYSTEM

Clinton R. Hanna, Pittsburgh, and Stanley J. Mikina, Wilkinsburg, Pa., assignors to Westinghouse Electric Corporation, East Pittsburgh, Pa., a corporation of Pennsylvania Application September 7, 1944, Serial No. 553,030

13 Claims. (Cl. 322—23)

1

The present invention relates to a control system for controlling the speed of a variable-speed driving means to maintain the speed of a driven device substantially constant, or to cause it to vary in a predetermined manner, and it relates more particularly to a governor-controlled system for controlling the speed of an alternating-current generator driven by a variable-speed driving means.

The invention is especially adapted for controlling the speed of an alternating-current aircraft generator driven through a variable-ratio transmission from an airplane main engine, although its usefulness is obviously not restricted to this particular application. In the past, aircraft electrical systems have usually been relatively low-voltage direct-current systems supplied by direct-current generators driven directly from the main engines. As the size of airplanes has increased and the necessary electrical loads have increased, especially in military aircraft, these low-voltage direct-current systems have become undesirable, or even impractical, because of the prohibitive weight of the wiring required to carry the very heavy load currents. For these reasons, it has become necessary to change to a higher voltage for large airplanes, and because of the commutation and circuit-interruption problems involved in the operation of direct-current systems of reasonably high voltage at high altitudes, it is necessary, or at least desirable, to provide alternating-current systems for large aircraft. The alternating-current system also has other advantages which are, in general, similar to those which led to its general adoption for industrial use.

Aircraft generators are usually driven from the main engines of the airplane, which means that the speed of the generator is subject to sudden changes, as determined by flight requirements. This is not objectionable in the case of direct-current generators provided with voltage regulators, and such machines can readily be designed for satisfactory performance, and for parallel operation, throughout the expected range of speeds. In the case of alternating-current generators, however, a change in speed results in a corresponding change in frequency, which is objectionable because of its effect on motors and other loads supplied by the generator, and which cannot be tolerated when two or more generators are operated in parallel, because of the necessity of maintaining synchronism between such machines. In order to successfully use alternating-current generators driven by airplane main engines, therefore, it is necessary to drive the generator through a variable-ratio transmission, of a type in which the ratio can be varied continuously over a wide enough range to maintain the generator speed constant as the engine speed changes. The use of such a variable-ratio transmission requires a sensitive and accurate control system to automatically adjust the ratio of the transmission when the engine speed changes, so as to keep the output speed of the transmission constant. Such a control system must be fast in its action to prevent undesirable fluctuations in speed of the generator, and the ratio-adjusting means must be capable of developing considerable power to actuate the ratio-changing mechanism of the transmission, since such devices usually require the application of considerable force to change the ratio, especially at the higher ratios.

When two or more generators are operated in parallel, as is usually the case in aircraft systems, it is necessary to insure proper division of the load between the generators. This is most readily done by providing a drooping speed-load characteristic, so that the speed of the generators drops slightly as the load increases. If the speed of all of the generators is drooped the same amount, and if the no-load speeds of all the generators are the same, proper division of the load is automatically obtained. The control system for the variable-ratio transmission should therefore also include means responsive to the load for producing the desired speed droop as the load increases, so as to obtain proper division of load between the several generators.

The principal object of the present invention is to provide an accurate and sensitive control system for a variable-speed driving device to maintain constant the speed of a driven device, or to cause it to vary in a predetermined manner.

Another object of the invention is to provide a control system for a variable-ratio transmission to effect adjustment of the ratio so as to maintain the output speed constant, or to vary it in a predetermined manner.

A further object of the invention is to provide a control system for a variable-speed driving means driving an electric generator to maintain the speed of the generator constant when the load remains constant, and to cause the speed of the generator to vary in a predetermined manner as the load changes.

A more specific object of the invention is to provide a control system for a variable-speed driving means, the control system consisting of a governor responsive to the speed of a driven device and, preferably, also responsive to the load on the driven device, and a servomotor controlled by the governor for adjusting the speed of the driving means to maintain the speed of the driven device constant, or to cause it to vary in a predetermined manner as the load on the driven device changes.

A further object of the invention is to provide an accurate and sensitive governor device which is capable of responding to the speed of a controlled device to effect control of its speed, and which incorporates means to change the speed setting of the governor in response to change in load on the controlled device.

A still further object of the invention is to provide a hydraulic servomotor which is capable of developing considerable force but which can be accurately controlled by relatively small changes in an electric current controlling a fluid-pressure-actuated slide valve which in turn controls the movement of the piston on the servomotor.

The invention will be more fully understood from the following detailed description, taken in connection with the accompanying drawings, in which:

Figure 1 is a diagrammatic view showing the general arrangement of the apparatus involved;

Fig. 2 is a transverse vertical sectional view of the governor approximately on line II—II of Fig. 3;

Fig. 3 is a longitudinal vertical sectional view of the governor approximately on the line III—III of Fig. 2;

Fig. 6 is a schematic diagram showing the relation of the various parts, and the electrical connections.

Figure 4:
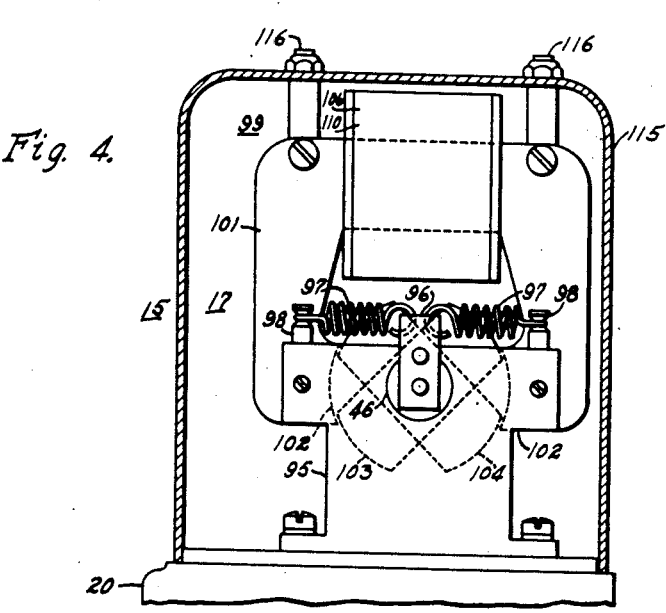
Fig. 4 is an end view of a part of the governor, the cover being in section on the line IV—IV of Fig. 3.

Fig. 1 shows the general arrangement of the type of apparatus which the control system of the present invention is intended to control. This figure shows an alternating-current generator 10 driven by a prime mover 11, which may be the main engine of an airplane, through a variable-ratio transmission 12, the alternator 10 preferably being directly connected to the output shaft of the transmission 12, as by a coupling 13. Since the speed of the prime mover 11 is subject to sudden changes which should not affect the generator speed, the transmission 12 is of a type in which the ratio is continuously variable, so that the speed of the generator can be maintained constant by changing the ratio of the transmission 12 when the speed of the prime mover 11 changes. In accordance with the present invention, this adjustment of the ratio of the transmission 12 to keep its output speed constant is accomplished by means of a servomotor 14 controlled by a governor 15, which in turn is actuated in accordance with the output speed of the transmission 12, or the speed of the generator 10, and which may also be responsive to the load on the generator 10 if it is desired to produce a slight drop in speed of the generator as the load increases.

The generator 10 is shown in Fig. 6 as a three-phase, four-wire generator, although it will be understood that it might equally well be a three-phase generator with no neutral lead brought out, or a single-phase generator. There is also shown in Fig. 6 a second, similar generator 10' connected to the same three-phase, four-wire bus for operation in parallel with the generator 10. The generator 10' is driven from a main engine of the airplane in the same manner as the generator 10 by means of a variable-ratio transmission with a control system identical to that shown and described below for the generator 10. It will be obvious that any desired number of generators may be connected to the bus for operation in parallel, each generator being driven through its own transmission and having its own speed control system.

As indicated above, the speed control system for the generator 10 consists of the servomotor 14 and the governor 15, which controls the operation of the servomotor. The governor 15 is shown in detail in Figs. 2, 3 and 4, and in the preferred embodiment shown in the drawing, it includes a speed-responsive portion 16 and a load-responsive portion 17. The speed-responsive part of the governor includes a forked member 18 in which a movable mass or weight 19 is supported for angular movement about an axis transverse to the axis of the forked member 18. The forked member 18 is positioned within a casing or housing 20, and its lower end is supported for rotation in the housing by means of a ball bearing 21, the lower end of the forked member 18 terminating in a square shaft 22 for engagement by any suitable driving means, such as the shaft and gearing 23 (Fig. 6), for driving the rotatable forked member 18 at a speed equal or proportional to the speed of the generator 10. A cap member 24 is secured in any suitable manner to the top ends of the two arms of the forked member 18, and is supported for rotation in a ball bearing 25 mounted in a cover member 26 rigidly secured in the top of the housing 20. Thus, the forked member 18 and cap 24 form a unitary assembly which rotates in the bearings 21 and 25.

The movable mass or weight 19 is rigidly secured on a hollow shaft 27 which extends transversely through the two arms of the forked member 18 and is rotatably supported in ball bearings 28. A torsion rod or torsion spring 29 is positioned in the hollow shaft 27 and is rigidly secured at one end to an extending end of the hollow shaft 27, as by means of a pin 30. The opposite end of the hollow shaft 27 does not extend beyond the arm of the forked member 18, and the extending end of the torsion rod 29 at that end is rigidly secured, as by a pin 31, in a sleeve portion of a plate 32 attached to the forked member 18. Thus the torsion spring 29 acts to resiliently oppose angular movement of the weight 19 about its transverse axis.

It will be seen that when the forked member 18 is rotated about its vertical axis, a centrifugal couple acts on the weight 19, because of the inclination of its longitudinal axis from the vertical, the centrifugal couple tending to rotate the weight about its transverse axis to a horizontal position. This angular movement of the weight 19 is resisted by the torsion spring 29, so that at every speed of the forked member 18 about its vertical axis, the weight 19 will assume an angular position with respect to the vertical axis such that the elastic torque of the twisted torsion rod 29 equals the centrifugal couple at that speed, and the angular displacement of the weight 19 from an initial position with the torsion rod untwisted is proportional to the square of the speed of rotation of the forked member 18 about its vertical axis. Thus, a very sensitive and accurate response is obtained even to slight changes in speed of the member 18.

The angular movement of the weight 19 about its transverse axis is changed to rectilinear motion by means of a push-rod assembly. The push-rod assembly includes a forked member 33 which is vertically movable in a passage or guideway extending through the cap member 24. A plurality of miniature precision ball bearings 34 is mounted in the forked member 32. The lowermost one of the ball bearings 34 rests on the inclined upper surface of the weight 19, and the other bearings 34 engage in narrow slots in the walls of the passage through the cap member 24 to guide the member 33 in rectilinear movement. By using the ball bearings 34, frictional error in the movement of the push-rod assembly is substantially eliminated, or at least greatly reduced. The upper end of the forked member 33 engages in a non-rotating cap 35, a ball bearing 36 being provided to permit rotation of the forked member 33 with respect to the cap 35. The cap 35 extends through an opening in an upward extension 37 of the cover member 26, and a helical compression spring 38 is provided between the top of the extension 37 and a flange on a downwardly extending part of the cap 35 to positively hold the push-rod assembly against the weight 19. A tip or push-rod 39 of fiber, or other insulating material, is secured in the cap 35 and is adapted to engage a pair of movable contacts 40 and 41.

In the normal operation of the governor when the forked member 18 is rotating at the speed which the governor is intended to maintain, the weight 19 is inclined at an angle of 45° to the vertical axis. In order to prevent the serious unbalance which the position of the weight 19 would cause, with resultant excessive vibration, a pair of balancing weights 42 and 43 is secured in the forked member 18, one adjacent the top 24 on one side of the weight 19, and the other at the bottom of the forked member on the opposite side. The centrifugal couple acting on the balancing weights 42 and 43 when the forked member 18 is rotating at its normal speed opposes the centrifugal couple acting on the weight 19 at that speed. In this way, dynamic balance of the rotating assembly is secured, because the balancing couple is equal to the torque of the torsion spring 29, which in turn is equal to the centrifugal couple acting on the weight 19. A setscrew 44 is preferably provided in the lower balancing weight 43 in position to engage in a recess 45 in the weight 19 to limit its movement when the governor is at rest. The setscrew 44 is preferably adjusted to prevent the weight 19 from moving to a position more than 10° to 15° below its normal operating position, in order to prevent raising the push-rod assembly too high, which would result in applying an undesirably great force to the contacts 40 and 41.

The contacts 40 and 41 are preferably carried on a rotatable shaft 46, and the contacts are mounted on a supporting block 47 which is rigidly secured on the shaft 46, as by a press fit, or in any other suitable manner. The lower contact 40 is mounted on a relatively flexible spring member 48, while the upper contact 41 is mounted on a relatively much stiffer spring member 49. The spring members 48 and 49 are secured on opposite sides of the supporting block 47 by means of screws 50, the springs being insulated from the block 47 by suitable pieces of insulating material 51. The springs 48 and 49 are arranged so that the contacts 40 and 41 are disposed in the path of movement of the tip 39 of the push-rod assembly, so that movement up or down of the push-rod assembly closes or opens the contacts 40 and 41. If desired, a guard member 52 may be provided to protect the contact assembly from accidental damage when the cover of the device is removed.

The contacts 40 and 41 are thus actuated by vertical movement of the push-rod 39 in response to angular movement of the weight 19 about its transverse axis. The contacts 40 and 41 are connected to control the servomotor 14 to effect adjustment of the speed ratio of the variable-ratio transmission 12 in accordance with changes in the output speed of the transmission so as to keep the output speed substantially constant. The vertical position of the contacts 40 and 41 with respect to the push-rod assembly determines the speed setting of the governor, and this position can be changed by rotation of the shaft 46, which may be done automatically in response to changes in load on the generator by the load-responsive portion 17 of the governor, as described hereinafter.

Figure 5:
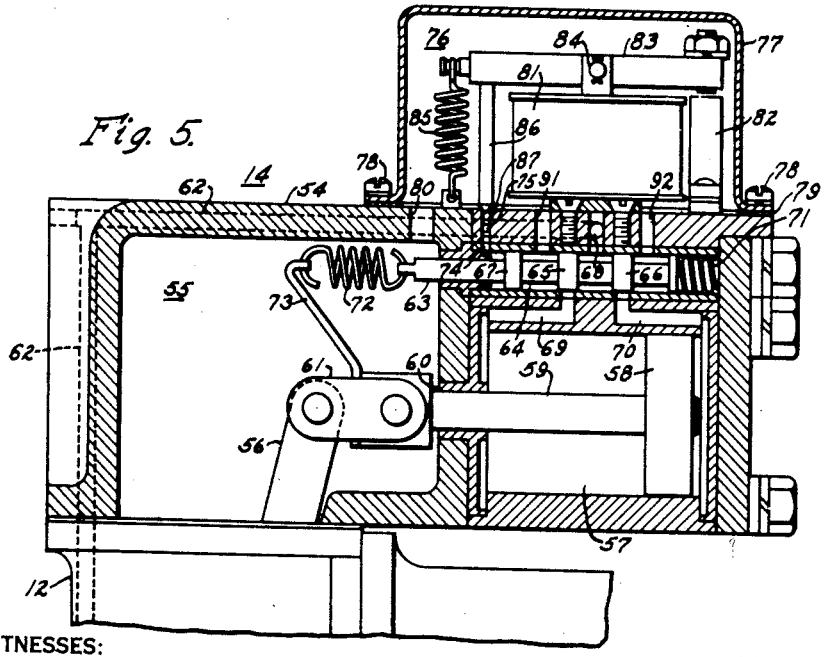
Fig. 5 is a longitudinal sectional view of the servomotor.

The servomotor 14 which effects adjustment of the ratio of the transmission 12, and which is controlled by the contacts 40 and 41 of the governor 15, is shown in detail in Fig. 5. The servomotor 14 consists of a housing 54 which is adapted to be mounted on the transmission 12, and which includes a chamber 55 enclosing the ratio-adjusting lever 56 of the transmission 12. The transmission 12 may, of course, be of any suitable type in which the ratio of output to input speed may be varied continuously by adjusting the position of the lever 56, or of an equivalent device. The servomotor 14 also includes a cylinder 57 in the housing 54 and a piston 58 movable in the cylinder 57. A piston rod 59 is attached to the piston and extends through a suitable packing 60 into the chamber 55. The end of the piston rod 59 is connected to the ratio-changing lever 56 by means of a pivoted link 61, so that movement of the piston 58 in either direction is effective to correspondingly move the lever 56 to change the ratio of the transmission. The piston 58 is moved in the cylinder 57 by means of hydraulic fluid, such as oil, which is supplied to the servomotor through a duct 62 extending through the housing 54. The duct 62 may be connected to a hydraulic system of any suitable type for supplying hydraulic fluid under pressure to the servomotor.

Admission of the hydraulic fluid to the cylinder 57 is controlled by a slide valve 63, which is movable in a small cylinder 64 located adjacent the cylinder 57. The slide valve 63 has a pair of lands or piston portions 65 and 66 which control the admission of hydraulic fluid to the cylinder 57, and has a piston 67 for effecting movement of the slide valve by means of fluid pressure. The duct 62 communicates with the center of the slide valve cylinder 64 by means of a port 68, and hydraulic fluid is admitted to and discharged from the cylinder 57 through ports 69 and 70 communicating with opposite ends of the cylinder. A compression spring 71 is disposed in one end of the slide valve cylinder 64 and engages the end of the slide valve 63, tending to move it to the left as seen in the drawing. The other end of the slide valve 63 extends out of the cylinder 64 and is attached to a tension spring 72, the other end of which is attached to an arm 73 secured to the end of the piston rod 59. The slide valve 63 is moved by hydraulic fluid which is admitted to the left-hand end of the slide valve cylinder 64 through a port 74. The port 74 communicates with the duct 62 through a small opening 75, and the port 74 also extends to a discharge space 76 on the outside of the housing 54. The discharge space 76 may be enclosed by a cover 77 secured to the housing 54 in any suitable manner, as by screws 78 with a gasket 79 to make the joint oiltight. Hydraulic fluid discharged into the discharge space 76 escapes through a drain opening 80 into the chamber 55 of the servomotor, from which it may be drained to a sump or disposed of in any other desired manner.

As stated above, the slide valve 63 controls the admission of hydraulic fluid to the cylinder 57 to effect movement of the piston 58. The movement of the slide valve 63, in turn, is controlled by the contacts 40 and 41 of the governor 15 by means of a solenoid 81 mounted in the discharge space 76. The solenoid 81 has a magnetic circuit which includes a core 82 at one side of the solenoid and a movable arm 83 pivoted on a shaft 84. The end of the arm 83 opposite the core 82 is attached to a tension spring 85, the other end of which is secured to the housing 54 of the servomotor, so that the downward pull of the spring 85 on one end of the pivoted arm 83 opposes the downward magnetic pull on the opposite end of the arm. A poppet valve 86 is mounted on the pivot arm 83 adjacent the end which is attached to the spring 85, and the valve 86 is positioned to engage in the orifice 87 at the upper end of the port 74, so as to partially or completely close the orifice, depending on the position of the arm 83. It will be seen that by varying the current in the solenoid 81 to increase or decrease the magnetic pull on the right-hand end of the pivoted arm 83, the position of the poppet valve 86 can be very accurately controlled to increase or decrease the opening of the orifice 87, and thus to vary the fluid pressure applied to the piston 67 of the slide valve 63. In this way very accurate control of the operation of the servomotor 14 is obtained.

As shown in Fig. 6, the governor contacts 40 and 41 are connected in series with the solenoid 81 and with a suitable direct-current source, indicated as a battery 88. A capacitor 89 and resistor 90 are preferably connected across the governor contacts in order to prevent sparking at the contacts and radio interference. Since the contacts 40 and 41 are opened and closed by movement of the push-rod assembly of the governor 15 in response to angular movement of the weight 19, and since opening and closing of the contacts alters the current in the solenoid 81, it will be apparent that the operation of the servomotor is controlled in accordance with the speed of the output shaft of the transmission 12 through the speed-responsive portion of the governor.

The operation of the system, as so far described, is as follows: When the prime mover 11 and generator 10 are at rest, the position of the parts will be as shown in the drawing, with the weight 19 of the governor 15 at an angle less than 45° to the vertical, as determined by the setscrew 44, and with the contacts 40 and 41 closed by the push-rod 39, which is in its extreme upper position. The servomotor will be in the position shown in Fig. 5 with the piston 58 at the right-hand end of the cylinder 57 and the ratio-changing lever 56 in its extreme right-hand position, which is the position corresponding to maximum speed ratio of the transmission 12. When the prime mover is started and drives the generator 10 through the transmission 12, the forked member 18 of the governor is rotated at a speed equal or proportional to the speed of the generator. As the speed increases, the centrifugal couple acting on the weight 19 increases and causes it to move angularly about its transverse axis to a more nearly horizontal position, permitting the push-rod 39 to move down. When the generator reaches its normal operating speed which the governor is set to maintain, the weight 19 will be at an angle of approximately 45° with respect to the vertical axis, and the contacts 40 and 41 will barely touch.

If the speed of the generator exceeds this speed, the weight 19 will move further towards a horizontal position, permitting the push-rod 39 to move down and open the contacts 40 and 41. When this occurs, the current through the solenoid 81 is interrupted, and the spring 85 pulls the poppet valve 86 down to completely close the orifice 87. With the orifice 87 closed, the full hydraulic pressure of the fluid supplied through the duct 62 is applied to the piston 67 of the slide valve 63 and causes it to move to the right, compressing the spring 71 and stretching the spring 72. When the slide valve moves a sufficient distance to the right, the land 66 uncovers the port 70, and hydraulic fluid is admitted through the inlet port 68 and port 70 to the right-hand end of the cylinder 57. At the same time, the land 65 uncovers the port 69 at the left-hand end of the cylinder 57 to communicate with a discharge opening 91. Thus, the piston 58 is moved to the left, and correspondingly moves the ratio-changing lever 56 to reduce the ratio of the transmission 12 and thus reduce the speed of the generator 10. As the piston and piston rod move to the left, the tension spring 72 is elongated and its tension increases. When the piston 58 has moved to a point at which the force exerted on the slide valve 63 by the spring 72 plus the force applied to the slide valve by the compression spring 71 is equal to the opposing fluid pressure force applied to the piston 67, the forces tending to move the slide valve in opposite directions balance, and the slide valve returns to its central position, shown in the drawing, in which the ports at both ends of the cylinder 57 are closed, so that movement of the piston 58 is stopped.

If the speed of the alternator becomes too low, requiring that the ratio of the transmission 12 be increased, the weight 19 moves angularly about its transverse axis to a more nearly vertical position, raising the push-rod 39 and closing the contacts 40 and 41, which barely touch at the normal speed. This increases the current in the solenoid 81, and thus increases the magnetic pull on the pivoted arm 83. The arm 83 therefore moves about its pivot to raise the poppet valve 86 against the force of the spring 85, and increases the opening of the orifice 87, permitting some of the hydraulic fluid to escape through the orifice. This reduces the fluid pressure applied to the slide valve 63, and the slide valve moves to the left under the influence of the tension spring 72 and compression spring 71. When the slide valve has moved a sufficient distance to the left, the land 65 opens the port 69 to communication with the inlet port 68, and the port 70 is simultaneously opened to communication with the discharge passage 92. Thus, hydraulic fluid is admitted to the left-hand end of the cylinder 57 and the piston 58 is moved to the right, correspondingly moving the lever 56 to increase the transmission ratio and bring up the speed of the generator. As the piston moves to the right, the tension of the spring 72 is decreased, and when it has decreased sufficiently so that the sum of the spring forces acting on the slide valve 63 balances the fluid pressure applied to it, the slide valve returns to its central position and stops the movement of the piston by closing the ports 69 and 70.

Since the movement of the slide valve 63, which controls the movement of the piston 58, is determined by the fluid pressure applied to the piston 67 and by the spring forces applied to the slide valve by the springs 71 and 72, it is obvious that the movement of the slide valve and therefore of the piston 58 can be very accurately controlled by varying the pressure applied to the piston 67. This is done by means of the poppet valve 86 which varies the opening of the orifice 87 to allow more or less of the hydraulic fluid to escape, and thus varies the pressure applied to the slide valve. It will be apparent that a large change in fluid pressure on the slide valve will require a relatively long movement of the piston 58 to cause the spring forces to balance the fluid pressure and return the slide valve to its central position, while a small change in fluid pressure on the slide valve will require a smaller movement of the piston 58 to cause the spring forces to balance the fluid pressure. Thus, the magnitude of the change in the fluid pressure applied to the slide valve determines the amount of movement of the piston 58 and therefore the amount of change in the ratio of the transmission 12.

The position of the poppet valve 86, which determines the fluid pressure applied to the slide valve, is controlled by the current in the solenoid 81 which, in turn is controlled by the governor contacts 40 and 41. Since the position of the poppet valve 86 is determined by the opposing forces of the spring 85 and the solenoid 81, it can be very accurately controlled by variation of the solenoid current and can be made quite sensitive to very small changes in current. In normal operation, when the generator is running at the correct speed, the position of the weight 19 and the push-rod 39 is such that the contacts 40 and 41 are maintained in a hovering condition. That is, the contacts are barely touching and may vibrate at a high frequency. This determines a substantially constant average current in the solenoid 81 and the slide valve 63 and piston 58 remain stationary. If the speed of the generator changes, the push-rod 39 moves up or down, depending on whether the speed has decreased or increased, and the solenoid current is changed because the position of the contacts 40 and 41 is changed relative to each other. In other words, the relative periods of "closed" time and "open" time of the vibrating contacts are changed and the average current is correspondingly changed. Of course, if the change in speed is great enough, the contacts will be completely separated or completely closed. The change in current in the solenoid thus effected causes movement of the piston 58 in the manner described above to change the ratio of the transmission 12 and bring the generator speed back to the desired value.

Since all parts of the system are capable of rapid and sensitive response to small changes in the respective controlling quantities, it will be apparent that the overall response of the system to changes in generator speed is very sensitive, and is fast enough to prevent any objectionable fluctuations in the speed of the generator. In spite of the sensitivity of the system, however, the servomotor 14 is capable of developing considerable power, which is required because it is usually necessary to apply a relatively large force to the lever 56 to change the transmission ratio, especially at the higher ratios. It is also to be noted that the operation of the servomotor is independent of the force required to move the lever 56, which may be different in different parts of its range of movement.

The operation of the system as so far described results in maintaining the speed of the generator 10 substantially constant. In some cases, this may be the desired type of operation, and the contacts 40 and 41 may be supported on a fixed support. When it is desired to operate two or more generators in parallel, however, as is customary in aircraft electrical systems, it is necessary to provide some decrease in speed of the generator as the load increases, in order to obtain proper division of the load between the generators, and for this purpose a load-responsive means 17 is incorporated in the governor 15. As previously explained, the contacts 40 and 41 are mounted on a support block 47 which is rigidly secured to a shaft 46. The shaft 46 is mounted for rotation in suitable bearings supported in brackets 95 mounted on the top of the housing 20. One end of the shaft 46 is extended through one of the brackets 95 and a sheet metal lug or ear 96 is secured to that end of the shaft. Tension springs 97 are attached to the ear 96, and the opposite ends of the springs 97 are secured to the outer ends of the bracket 95 by means of studs 98. Thus, the tension springs 97, pulling in opposite directions on the ear 96, tend to hold the shaft 46 centered in a fixed position.

The shaft 46 is rotated against the opposition of the springs 97 by means of generator-load-responsive means comprising a torque motor assembly 99. The torque motor 99 consists of two identical laminated stator core assemblies 100 and 101, which have polar portions, indicated at 102, on opposite sides of the shaft 46. The stator core assemblies may be supported on the brackets 95 in any suitable manner. Two laminated rotor members 103 and 104 are mounted on the shaft 46, the rotor member 103 cooperating with the stator core 100 and the rotor 104 cooperating with the stator core 101. As clearly shown in Fig. 4, the two rotors 103 and 104 are mounted at an angle of 90° with respect to each other so that they engage opposite extremities of the polar portions of their respective stator cores and produce opposing torques.

Each of the stator cores 100 and 101 has a potential coil, 105 and 106, respectively, wound on it. In order to insure equal current in both of the potential coils 105 and 106, they are preferably connected in series as shown in Fig. 6. The potential coils are connected across the output voltage of the generator, or the line voltage. In the case of a three-phase, four-wire generator, the potential coils are connected across the line-to-neutral voltage, as shown. In the case of a three-wire, three-phase system, the potential coils should be connected across a voltage having the same phase position as the line-to-neutral voltage, which can readily be obtained in a wellknown manner. A capacitor 107 and a ballast resistor 108 are preferably connected in series with the potential coil 105 and 106 in order to bring the potential coil current substantially in phase with the line voltage. Each of the stator cores 100 and 101 also has a current coil, 109 and 110, respectively, wound on it. The current coils are wound so as to oppose each other and are connected in series to a current transformer 111 which is energized by the load current. The load-responsive portion 17 of the governor may be enclosed by a cover 115 which fits on the top of the governor housing 20 and which is held in place by means of nuts engaging threaded studs 116 which are threaded into holes in longitudinal bars 117 extending between the upper parts of the stator cores 100 and 101.

The torque motor 99 produces a torque on the shaft 46 which is very closely proportional to the actual watts load on the generator 10, and which can be made substantially independent of the load power factor. This may be seen in the following manner. The potential coil flux of either of the potential coils at any time $t$ is $\phi_p \sin(\omega t - \beta)$, where $\omega$ is equal to $2\pi$ times the frequency and $\beta$ is the phase angle between the line voltage and the potential coil current. Similarly, the current coil flux of either of the current coils at the same instant is $\phi_c \sin(\omega t - \theta)$ where $\theta$ is the phase angle between the line voltage and line current. Since the rotors 103 and 104 are arranged to produce opposing torques, and since the current coils oppose each other, the net torque T of the torque motor 99 is $$T = K[\phi_p \sin(\omega t - \beta) + \phi_c \sin(\omega t - \theta)]^2 - K[\phi_p \sin(\omega t - \beta) - \phi_c \sin(\omega t - \theta)]^2$$

where K is a constant which is the same for both parts of the torque motor since they are of identical design. This equation reduces to $$T = 2K\phi_p\phi_c (\cos\beta \cos\theta + \sin\beta \sin\theta)$$

The torque proportional to the actual value of line watts is $$T' = 2K\phi_p\phi_c \cos\theta$$

Therefore, the ratio of the torque produced by the torque motor to the torque proportional to the actual value of line watts is $$\frac{T}{T'} = \cos\beta + \sin\beta \tan\theta$$

By suitable choice of the capacitor 107 and ballast resistor 108, the angle $\beta$ between the line voltage and potential coil current can be made very small, so that the first term of the above expression approaches unity and the second term approaches zero. Thus the accuracy of measurement of the torque motor can be made substantially independent of the angle $\theta$, and the torque is closely proportional to the actual line watts for all values of load power factors. The effect of mutual inductance between the current coils and potential coils is eliminated as far as the output torque on the shaft 46 is concerned because the effect of one current coil on its potential coil flux is balanced by the opposing effect of the other current coil, which is wound in opposition.

Thus the torque motor 99 applies a torque to the shaft 46 which is substantially proportional to the generator load, and which opposes the restraining force of the centering springs 97. The shaft 46 therefore rotates a small amount as the load on the generator changes, and produces a corresponding change in the speed setting of the governor by changing the position of the contacts 40 and 41. Thus, for example, when the load increases, the torque applied to the shaft 46 increases, and the shaft rotates against the force of the springs 97 in a direction to move the contacts 40 and 41 up with respect to the push-rod 39. This obviously changes the speed setting of the governor by an amount dependent on the amount of movement of the contacts, since it is necessary for the push-rod 39 to be at a higher point to maintain the contacts 40 and 41 in a hovering condition, and this requires a lower generator speed. In this way, the required speed droop is automatically obtained, and proper division of the load between two or more generators operating in parallel is obtained.

In case it is desired to change the speed setting of the governor 15 for the purpose of synchronizing the generator when it is being connected to the system, or for any other purpose, this may readily be provided for by connecting a shunting potentiometer 112 across the potential coils 105 and 106 of the torque motor, with an adjustable contact 113 connected between the potential coils. Shifting of the adjustable contact 113 changes the relative voltages across the coils 105 and 106 and thus effects a change in the torque produced by the torque motor and correspondingly changes the speed setting of the governor. It will be obvious that the position of the movable contact 113 can be adjusted either manually or by any suitable automatic synchronizing means.

It should now be apparent that a speed control system has been provided which is very suitable for controlling the speed of alternating-current generators for aircraft use, since it is capable of very accurate and sensitive response and is sufficiently fast in its operation to prevent undesirable fluctuations in speed. This control system has many advantages for the purpose stated, since it meets the requirements of sensitivity and fast operation, as well as providing ample force to operate the ratio-changing mechanism of any type of variable-ratio transmission. The governor includes a load-responsive means as well as a speed-responsive means, so that the speed droop required for parallel operation of two or more generators is readily and automatically obtained. A further advantage of the system as described is that in case of failure of any part of the system, such as interruption of the circuit between the governor contacts and the servomotor solenoid 81, the servomotor will move the ratio-adjusting lever to the low speed position, thus preventing overspeeding of the generator. This is an additional safety feature of the present invention.

It will be understood that the invention is capable of various modifications. For example, if the load-responsive feature of the governor is not desired, the torque motor 99 might be omitted, and the contacts 40 and 41 mounted on a fixed support. It will also be obvious that the invention is not limited to use with a variable-ratio transmission, but that it could be used equally well to actuate any type of speed-controlling or speed-adjusting means, such as the throttle of an engine. It is to be understood, therefore, that the invention is not limited to the specific arrangement and details of construction described, but in its broadest aspects, it covers all equivalent embodiments and modifications which come within the scope of the appended claims.

We claim as our invention:

1. In a control means for a variable-speed driving means driving an electric generator, the control means including servomotor means for adjusting the output speed of said driving means, a governor device for controlling the operation of the servomotor means, said governor device including contact means for controlling the servomotor, a rotatable element adapted to be driven at a speed having a fixed relation to the speed of said generator, a movable mass mounted on said rotatable element and adapted to change its angular position with respect to the axis of the rotatable element in response to change in speed of the rotatable element, a linearly movable member in the rotatable element, said linearly movable member engaging said movable mass to be moved thereby when the movable mass changes its angular position, and said linearly movable member having a nonrotating end portion in position to engage said contact means, whereby movement of the linearly movable member in response to change in speed of the rotatable element actuates the contact means to effect operation of the servomotor means to maintain the speed of the generator substantially constant.

2. In a control means for a variable-speed driving means driving an electric generator, the control means including servomotor means for adjusting the output speed of said driving means, a governor device for controlling the operation of the servomotor means, said governor device including contact means for controlling the servomotor means, a forked rotatable element adapted to be driven at a speed having a fixed relation to the speed of said generator, a movable mass rotatably mounted on a transverse axis in said forked element and adapted to move angularly about said axis under the influence of centrifugal force, resilient means opposing said angular movement of the movable mass, a movable member in said forked element guided for linear movement parallel to the axis of the forked member, said linearly movable member engaging the movable mass to be moved thereby when the movable mass changes its angular position, and said linearly movable member having a nonrotating end portion in position to engage said contact means, whereby movement of the linearly movable member in response to change in speed of the rotatable element actuates the contact means to effect operation of the servomotor means to maintain the speed of the generator substantially constant.

3. In a control means for a variable-speed driving means driving an electric generator, the control means including servomotor means for adjusting the output speed of said driving means, a governor device for controlling the operation of the servomotor means, said governor device including a rotatable element adapted to be driven at a speed having a fixed relation to the speed of said generator, a movable mass mounted on said rotatable element and adapted to change its angular position with respect to the axis of the rotatable element in response to change in speed of the rotatable element, a linearly movable member in the rotatable element, said linearly movable member engaging said movable mass to be moved thereby when the movable mass changes its angular position, and said linearly movable member having a nonrotating end portion, contact means for controlling the servomotor means, means for supporting the contact means in position to be engaged by the end portion of said linearly movable member, whereby the contact means is actuated by the linearly movable member to effect operation of the servomotor means to maintain the speed of the generator substantially constant, and means responsive to the load on the generator for changing the position of the contact means relative to the linearly movable member when the generator load changes, whereby the speed of the generator is varied in a predetermined manner as the load changes.

4. In a control means for a variable-speed driving means driving an electric generator, the control means including servomotor means for adjusting the output speed of said driving means, a governor device for controlling the operation of the servomotor means, said governor device including a rotatable element adapted to be driven at a speed having a fixed relation to the speed of said generator, a movable mass mounted on said rotatable element and adapted to change its angular position with respect to the axis of the rotatable element in response to change in speed of the rotatable element, a linearly movable member in the rotatable element, said linearly movable member engaging said movable mass to be moved thereby when the movable mass changes its angular position, and said linearly movable member having a nonrotating end portion, contact means for controlling the servomotor means, movable supporting means for supporting the contact means in position to be engaged by the end portion of said linearly movable member, whereby the contact means is actuated by the linearly movable member to effect operation of the servomotor means to maintain the speed of the generator substantially constant, means opposing movement of said movable support means, and torque motor means for applying a force tending to move the movable support means, said torque motor means being adapted to produce a torque proportional to the load on the generator, whereby the position of the contact means relative to the linearly movable member is changed when the generator load changes, and the speed of the generator is varied in a predetermined manner as the load changes.

5. A governor device for controlling the speed of an electric generator, said governor device comprising speed-responsive means responsive to the speed of the generator, said speed-responsive means including a movable member movable in response to changes in speed, contact means for effecting control of the speed of the generator, movable support means for supporting said contact means in the path of said movable member to be actuated thereby to maintain the generator speed substantially constant, spring means opposing movement of said movable support means, and torque motor means for applying a force tending to move said movable support means to change the position of the contact means relative to the movable member to change the speed setting of the governor, said torque motor means being adapted to produce a torque proportional to the load on the generator, whereby the speed of the generator is varied in a predetermined manner as the load changes.

6. A governor device for controlling the speed of an electric generator, said governor device comprising speed-responsive means responsive to the speed of the generator, said speed-responsive means including a movable member movable in response to changes in speed, contact means for effecting control of the speed of the generator, movable support means for supporting said contact means in the path of said movable member to be actuated thereby to maintain the generator speed substantially constant, spring means opposing movement of said movable support means, and torque motor means for applying a force tending to move said movable support means to change the position of the contact means relative to the movable member to change the speed setting of the governor, said torque motor means comprising two stator cores and two rotor members, the rotor members being mounted on a common shaft and angularly displaced 90° so that they produce opposing torques, a potential coil on each stator core, the two potential coils being connected in series across the generator voltage, and a current coil on each stator core, the two current coils being connected in opposition and energized in response to the generator load current, whereby the net torque of the torque motor means is proportional to the load on the generator and the contact means is moved to vary the generator speed in a predetermined manner as the load changes.

7. A governor device for controlling the speed of an electric generator, said governor device comprising speed-responsive means responsive to the speed of the generator, said speed-responsive means including a movable member movable in response to changes in speed, contact means for controlling the speed of the generator, movable support means for supporting said contact means in the path of said movable member to be actuated thereby to maintain the generator speed substantially constant, spring means opposing movement of said movable support means, and torque motor means for applying a force tending to move said movable support means to change the position of the contact means relative to the movable member to change the speed setting of the governor, said torque motor means comprising two stator cores and two rotor members, the rotor members being mounted on a common shaft and angularly displaced 90° so that they produce opposing torques, a potential coil on each stator core, the two potential coils being connected in series across the generator voltage, and a current coil on each stator core, the two current coils being connected in opposition and energized in response to the generator load current, whereby the net torque of the torque motor means is proportional to the load on the generator and the contact means is moved to vary the generator speed in a predetermined manner as the load changes, and means connected across said potential coils for changing the voltage applied to the potential coils to change the torque of the torque motor means and thereby adjust the speed setting of the governor.

8. Control means for a variable-speed driving means driving a driven device, said control means comprising a hydraulic servomotor having a cylinder, a piston movable in said cylinder for adjusting the speed of said driving means, valve means for controlling the admission of fluid to said cylinder to effect movement of the piston, and electromagnetic means for controlling said valve means, and a governor device including contact means for controlling said electromagnetic means, speed-responsive means responsive to the speed of the driven device, said speed-responsive means being adapted to actuate said contact means to effect operation of the servomotor to maintain the speed of the driven device substantially constant when the load on the driven device remains constant, and means responsive to the load on the driven device, said load-responsive means being adapted to change the speed setting of the governor to cause the speed of the driven device to vary in a predetermined manner when the load changes.

9. Control means for a variable-speed driving means driving a driven device, said control means comprising a hydraulic servomotor having a cylinder, a piston movable in said cylinder for adjusting the speed of said driving means, valve means for controlling the admission of fluid to said cylinder to effect movement of the piston, said valve means being movable in one direction by fluid pressure, means tending to move the valve means in the opposite direction, means for varying the fluid pressure applied to the valve means to control its movement, and electromagnetic means for controlling said pressure-varying means, and a governor device including contact means for controlling said electromagnetic means, and means responsive to the speed of the driven device for actuating said contact means.

10. Control means for a variable-speed driving means driving a driven device, said control means comprising a hydraulic servomotor having a cylinder, a piston movable in said cylinder for adjusting the speed of said driving means, a slide valve for controlling the admission of fluid to said cylinder to effect movement of the piston, said slide valve being movable in one direction by fluid pressure, spring means tending to move the slide valve in the opposite direction, valve means for varying the fluid pressure applied to the slide valve to control its movement, and electromagnetic means for controlling the pressure-varying valve means, and a governor device including contact means for controlling said electromagnetic means, and means responsive to the speed of the driven device for actuating said contact means.

11. Control means for a variable-speed driving means driving a driven device, said control means comprising a hydraulic servomotor having a cylinder, a piston movable in said cylinder for adjusting the speed of said driving means, a slide valve for controlling the admission of fluid to said cylinder to effect movement of the piston, said slide valve being movable in one direction by fluid pressure, spring means tending to move the slide valve in the opposite direction, valve means for varying the fluid pressure applied to the slide valve to control its movement, electromagnetic means for controlling the pressure-varying valve means to effect movement of the slide valve and thereby of the piston, and means responsive to movement of the piston for varying the force of said spring means, whereby the slide valve is returned to its initial position after movement of the piston in either direction, and a governor device including contact means for controlling said electromagnetic means, and means responsive to the speed of the driven device for actuating said contact means.

12. Control means for a variable-speed driving means driving an electric generator, said control means comprising a hydraulic servomotor for adjusting the output speed of said driving means, valve means for controlling the operation of said servomotor, electromagnetic means for controlling said valve means, and a governor device, said governor device including a rotatable element adapted to be driven at a speed having a fixed relation to the speed of said generator, a movable mass mounted on said rotatable element and adapted to change its angular position with respect to the axis of the rotatable element in response to change in speed of the rotatable element, a linearly movable member in the rotatable element, said linearly movable member engaging said movable mass to be moved thereby when the movable mass changes its angular position, and said linearly movable member having a nonrotating end portion, contact means for controlling said electromagnetic means, means for supporting the contact means in position to be engaged by the end portion of said linearly movable member, whereby the contact means is actuated by the linearly movable member to effect operation of the servomotor means to maintain the speed of the generator substantially constant, and said governor device also including means responsive to the load on the generator for changing the position of the contact means relative to the linearly movable member when the generator load changes, whereby the speed of the generator is varied in a predetermined manner as the load changes.

13. Control means for a variable-speed driving means driving an electric generator, said control means comprising a hydraulic servomotor for adjusting the output speed of said driving means, valve means for controlling the operation of said servomotor, electromagnetic means for controlling said valve means and a governor device, said governor device including a rotatable element adapted to be driven at a speed having a fixed relation to the speed of said generator, a movable mass mounted on said rotatable element and adapted to change its angular position with respect to the axis of the rotatable element in response to change in speed of the rotatable element, a linearly movable member in the rotatable element, said linearly movable member engaging said movable mass to be moved thereby when the movable mass changes its angular position, and said linearly movable member having a nonrotating end portion, contact means for controlling said electromagnetic means, movable supporting means for supporting the contact means in position to be engaged by the end portion of said linearly movable member, whereby the contact means is actuated by the linearly movable member to effect operation of the servomotor means to maintain the speed of the generator substantially constant, means opposing movement of said movable support means, and torque motor means for applying a force tending to move the movable support means, said torque motor means being adapted to produce a torque proportional to the load on the generator, whereby the position of the contact means relative to the linearly movable member is changed when the generator load changes, and the speed of the generator is varied in a predetermined manner as the load changes.

CLINTON R. HANNA.
STANLEY J. MIKINA.

REFERENCES CITED

The following references are of record in the file of this patent:

UNITED STATES PATENTS

| Number | Name | Date |
| --- | --- | --- |
| 713,463 | Lighthipe | Nov. 11, 1902 |
| 864,547 | Lemmon | Aug. 27, 1907 |
| 935,051 | Parker | Sept. 28, 1909 |
| 1,683,785 | Kummenich | Sept. 11, 1928 |
| 1,784,504 | Tanner | Dec. 9, 1930 |
| 2,008,231 | Vincent | July 16, 1935 |
| 2,225,321 | Schwender | Dec. 17, 1940 |
| 2,243,781 | Thornhill | May 27, 1941 |
| 2,266,598 | Hale | Dec. 16, 1941 |
| 2,269,434 | Brooks | Jan. 13, 1942 |
| 2,344,352 | Graham | Mar. 14, 1944 |
| 2,442,170 | Heintz | May 25, 1948 |